April 16, 1946. J. J. CHAVAYDA 2,398,618
COUPLING FOR TUBES
Filed Jan. 8, 1945
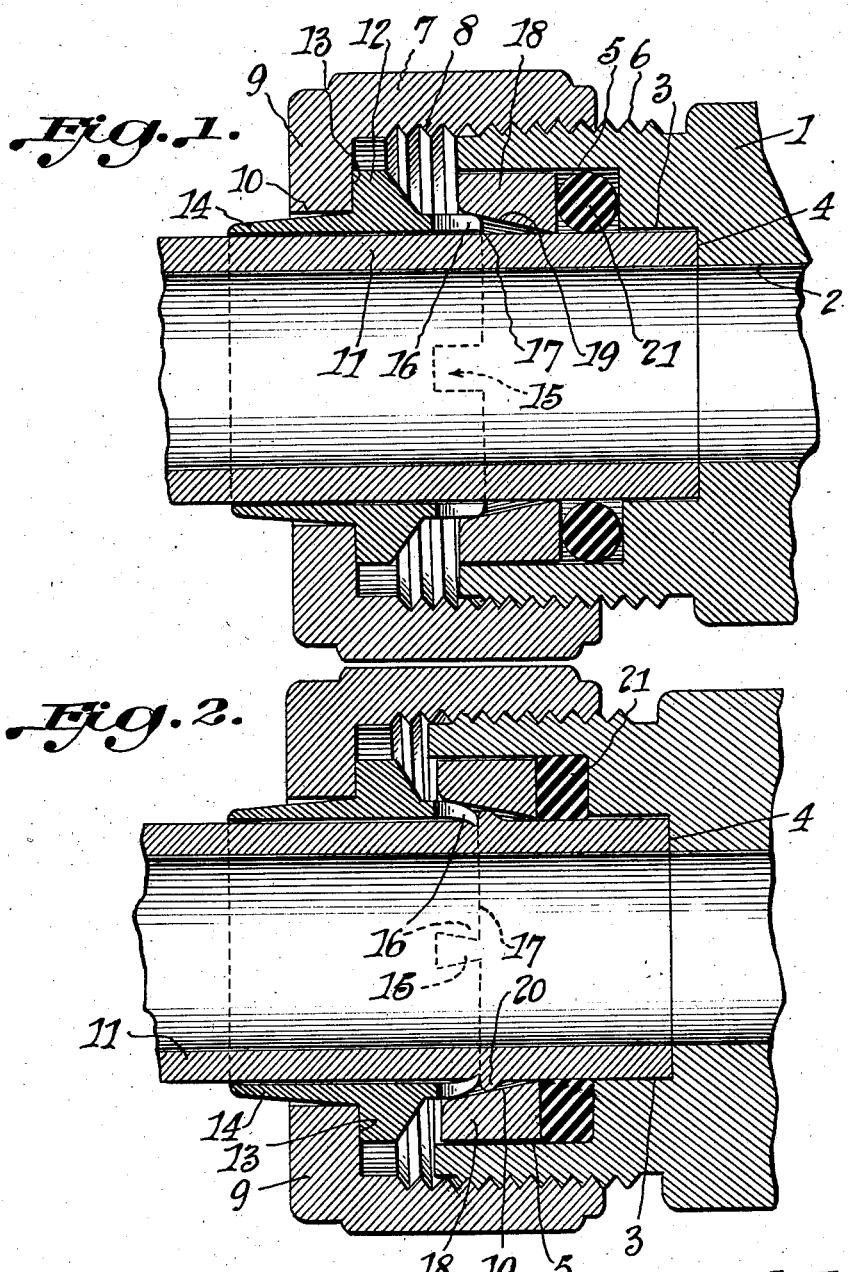
Inventor
Joseph J. Chavayda
By Mason, Porter & Ailler
Attorneys Patented Apr. 16, 1946

2,398,618

UNITED STATES PATENT OFFICE 2,398,618

COUPLING FOR TUBES

Joseph J. Chavayda, Cleveland, Ohio, assignor to The Parker Appliance Company, Cleveland, Ohio, a corporation of Ohio Application January 8, 1945, Serial No. 571,816

2 Claims. (Cl. 285—122)

The invention relates to new and useful improvements in a coupling for tubes and more particularly to a coupling for a flareless tube.

An object of the invention is to provide a coupling including a body member and a nut wherein a sleeve having gripping devices is contracted into engagement with the tube for cutting into and forming a shoulder therein by a camming ring having a very gradually tapered surface contacting with said sleeve, and wherein said camming ring is restrained from movement in the coupling by a ring gasket disposed between said ring and the body member.

A further object of the invention is to provide a coupling of the above type wherein the gripping devices are formed by longitudinal recesses extending lengthwise into said sleeve from the inner end thereof, thus setting off gripping devices having sharp cutting edges which are easily contractible into cutting engagement with the tube whereby a shoulder in the tube may be rolled up by said cutting devices without bulging the tube inwardly.

In the drawing—

Figure 1 is a longitudinal sectional view through a coupling embodying the improvements with the nut in finger-tight engagement with the body member;

Figure 2 is a view similar to Figure 1 but showing the coupling closed and the tube firmly gripped and held therein.

The coupling includes a body member, having the usual bore 2 therethrough. Said body member is counter-bored at 3 to provide a seat 4. It is again counter-bored at 5 to provide an annular recess surrounding the tube. The body member is provided with a thread 6. Cooperating with the body member is a nut 7 having a thread 8 adapted to engage the thread 6 on the body member. Said nut has an inwardly extending flange 9 provided with an opening 10 through which the tube extends into the coupling. The tube is indicated at 11 and is shown as extending into the coupling with its inner end in engagement with the seat 4.

Surrounding the tube and disposed within the nut is a sleeve 12 having a shoulder 13 engaged by the flange 9 of the nut. The opening 10 is of larger diameter than the tube and the sleeve has an extension 14 which extends through the opening and along the tube for damping vibrations therein. The sleeve at its inner end is provided with recesses 15 at spaced intervals. As shown in the drawing, there are four of these recesses and the recesses extend longitudinally into the sleeve and set off gripping devices 16 having sharp cutting edges 17.

Disposed in the annular recess in the body member is a camming ring 18. Said camming ring is provided on its inner face with a gradually tapered camming surface 19. This camming surface may be at an angle of approximately 10° to the surface of the tube. The camming surface is so dimensioned that when a nut is turned onto the body member the gripping devices will enter the camming ring, engage the tapered camming surface and be gradually forced inwardly so that the cutting edge will engage the tube and roll up a shoulder 20.

Disposed in the annular recess in the body member between the camming ring and the body member is a ring gasket 21. Said ring gasket is preferably circular in cross section. When the nut is screwed onto the body member the sleeve will be forced into engagement with the camming ring and the camming ring will be forced into engagement with the ring gasket. The ring gasket will be deformed as shown in Figure 2. As the ring gasket is gradually deformed to fill the recess between the camming ring and the body member, said camming ring will be gradually restrained in its endwise movements. This, together with the gradual tapering of the ring at the inner face thereof will cause the gripping end of the sleeve to be contracted into engagement with the tube, first with a light pressure which gradually increases as the outer surface of the tube is shaved and rolled into a shoulder. This is all accomplished without any radial pressure on the tube which would tend to bulge the tube inwardly and thus restrict the bore of the tube. In other words, the pressure exerted by the cutting edges of the sleeve is almost wholly longitudinal of the sleeve rather than radial of the sleeve. When the ring gasket is fully deformed to fill the recess therefor, the camming ring will be held from further movement into the body member and the gripping fingers will be held by the nut in firm gripping contact with the shoulder formed in the tube and the tube in turn held firmly against the seat 4.

From the above it will be apparent that a coupling has been provided wherein very light torque pressure is necessary in order to produce a firm gripping or locking of the tube to the coupling and the sealing of the connection between the tube and the coupling. Not only is the sealing gasket, by the deforming of the same, forced into tight sealing contact with the tube and the body member, but if there should be fluid pressure on the line and it should leak across the seat 4 and contact with the ring gasket, it will create a pressure on the ring gasket which tends to expand it radially and tighten the seal.

It is obvious that many changes in the details of construction may be made without departing from the spirit of the invention as set forth in the appended claims.

I claim:

1. A coupling for tubes comprising a body member having a seat for the end of the tube, a nut having a threaded engagement with said body member, said body member having a counterbore providing an annular recess surrounding the tube, a sleeve surrounding the tube and having a shoulder intermediate the ends thereof engaged by the nut, said sleeve having longitudinal slots at spaced intervals at its inner end providing gripping devices having sharp cutting edges, a ring sealing gasket disposed in said recess, a camming ring disposed in said recess between the sleeve and the gasket, said camming ring having a gradually tapering surface adapted to engage the inner end of said sleeve when the nut is turned onto said body member for causing said cutting edges to cut into said tube and form a holding shoulder for retaining said tube in the coupling.

2. A coupling for tubes comprising a body member having a seat for the end of the tube, a nut having a threaded engagement with said body member, said body member having a counterbore providing an annular recess surrounding the tube, a sleeve surrounding the tube and having a shoulder intermediate the ends thereof engaged by the nut, said sleeve having longitudinal slots at spaced intervals at its inner end providing gripping devices having sharp cutting edges, a ring gasket disposed in said recess, said ring gasket being substantially circular in cross section, a camming ring disposed in said recess between the sleeve and the gasket, said camming ring having a gradually tapering surface adapted to engage the inner end of the sleeve when the nut is turned onto the body member for causing said cutting edges to cut into said tube and form a holding shoulder, said camming ring being movable longitudinally of the tube in said recess and restrained by the deforming of the gasket so that the pressure of the cutting edge of the tube is a gradually increasing pressure exerted in a direction substantially longitudinal of the tube.

JOSEPH J. CHAVAYDA.